United States Patent [19]

Hasenwinkle

[11] 3,961,654

[45] June 8, 1976

[54] LOG CUTTING AND REJOINING PROCESS

[75] Inventor: Earl Dean Hasenwinkle, Longview, Wash.

[73] Assignee: Weyerhaeuser Company, Tacoma, Washington 98401

[22] Filed: Feb. 20, 1973

[21] Appl. No.: 333,911

[52] U.S. Cl. .................................. 144/316; 52/730; 144/309 L; 144/314 R; 144/314 B; 144/312; 144/316; 144/326 R; 156/264; 428/80; 428/98

[51] Int. Cl. .............................................. B32b 3/14

[58] Field of Search ................. 156/264; 144/309 L, 144/314 R, 314 B, 312, 313, 315 R, 316, 321; 52/730, 514; 161/36, 41, 270

[56] References Cited

UNITED STATES PATENTS

| | | | |
|---|---|---|---|
| 1,504,616 | 8/1924 | Gary | 144/312 |
| 1,732,743 | 10/1929 | Douherry | 144/312 |
| 2,720,899 | 10/1955 | Miller | 144/326 R |
| 3,648,743 | 3/1972 | Fino et al. | 144/312 X |
| 3,736,215 | 5/1973 | Felder, Jr. et al. | 156/264 X |

FOREIGN PATENTS OR APPLICATIONS

| | | | |
|---|---|---|---|
| 49,303 | 9/1931 | Norway | 144/316 |

*Primary Examiner*—Andrew R. Juhasz
*Assistant Examiner*—W. D. Bray

[57] ABSTRACT

A process for making composite lumber products from generally cylindrical logs includes the steps of cutting a log radially into a plurality of sector-shaped pieces, rejoining two of the cut pieces by bonding them together along opposed radial faces such that the thin edge of one is approximately adjacent the thick edge of the other and then machining the bonded pair into a desired shape. The sector pair can be machined into a rectangle or a parallelogram. A plurality of compatible parallelograms or rectangles can then be edge bonded together into wider planar shapes after which the wider composite member can be rip cut longitudinally to selected widths. A method is described for proper sizing of the sector pieces depending upon log size and desired thickness of the composite lumber product. Taper is captured by reversing longitudinally one sector piece of each pair prior to bonding.

The resulting composite product has many improved characteristics and offers a vertical grain pattern over its wider dimension. Greatly increased lumber yields result when manufacturing lumber products according to the present process, especially when converting smaller diameter logs.

12 Claims, 18 Drawing Figures

LOG CUTTING AND REJOINING PROCESS

BACKGROUND OF THE INVENTION

This invention relates generally to a new process for converting round logs of proper grade into lumber products, primarily dimension lumber. More particularly, it relates to a log cutting and laminating or rejoining process that can readily utilize the smaller diameter logs for converting them to lumber products whereby the yield of lumber from the wood volume in the log is substantially increased.

The centuries old conversion process of sawing logs into lumber results in a very low lumber yield in that, of the total volume of wood in a green log, less than half is or can be converted into usable lumber, primarily because of the constraint that square or rectangular pieces are cut from a cylindrical log. The actual lumber yields utilizing known processes of course vary depending on a number of factors such as log diameter, but even with the best available computer controlled sawing machines the normal yield of lumber from a log is at best sixty percent of the total wood volume. The term lumber is intended to mean that wood product traditionally having the highest marketable value of those products derivable on a longitudinal sawing basis from a log and generally being rectangular in cross section.

The most commonly used log to lumber converting process is that where saws make a plurality of longitudinal cuts through the log with each successive cut generally being in a plane parallel or perpendicular to the previous cut. With this process it is obvious that there are yield limitations simply from the fact that the beginning raw material is cylindrical in nature while the desired final lumber product is rectangular in nature. The wood volume not converted into lumber is utilized in a variety of other ways none of which offer the value of a lumber product. The sawdust can be used as fuel, in particleboard, and the like. The solid wood slabs and edgings can be chipped into small pieces suitable for wood pulp production or likewise they can be used for fuel.

In the past there have been many suggestions of ways to increase the recovery of solid wood products that could be converted from a log. Veneer production and subsequent laminating methods has been one suggestion. In veneer production the cylindrical log is converted into pieces of wood veneer which can then be laminated together to form various wood products. Such composite products and their converting processes do convert more of the wood volume into generally solid wood products, but they still do not generally have the market acceptance of lumber.

The problem of low lumber yields from round logs becomes compounded with the logs have a small diameter which is on the order of from 5–15 inches. The fact is that as the diameter of the logs become smaller a larger percentage of wood volume will necessarily be allocated to sawdust and slabs and edgings. Another factor to be considered, is that as forests are regenerated and harvested the log diameters will, on an overall basis, tend to be smaller when they are ready for breakdown into lumber products.

It thus becomes apparent, in view of the strikingly low lumber yields from present converting processes, that new and improved processes must be conceived and developed to increase the lumber yield from round logs, especially those having a small diameter. Since the demand for lumber products will continue to rise it is essential that processes be developed that can convert a greater amount of round wood volume into lumber.

Such a process should be reasonably simple in order to maintain the high production rates that are necessary in the lumber manufacturing industry. The process comprising the present invention offers simplicity and efficiency in addition to greatly increased yields.

The composite lumber product that is formed according to the process of the present invention has several characteristics that in fact make it a superior product when compared to traditionally manufactured lumber. In view of the composite nature of the product defects tend to be randomized over the product length by the placement procedure with the individual pieces. An additional advantage in the product results from the orientation of the grain structure of pieces going into the composite product. The cutting step in the process will yield sector or wedge shaped pieces in cross section having three sides. The two faces having longer sides will be comprised of vertical grain while the third face having a shorter side will be comprised of flat grain. Briefly, vertical grain is that grain orientation where the annual rings are generally perpendicular to the particular face while flat grain is that grain orientation where the annular rings are generally parallel to the particular face. Upon drying the sector shaped pieces before the rejoining step it will be recognized by those skilled in the art that cupping of the pieces will be substantially eliminated since the longer sides have vertical grain and only the smaller side has flat grain. The tendency of flat grained wood to cup results because wood shrinks in drying twice as much in a direction tangential to the annular rings as compared to the radial direction. Depending on the grain structure of a particular piece of solid lumber differential shrinkage rates result in distortion in both the cross sectional dimensions and over the length of the piece of lumber.

Because the sector shaped pieces have vertical grain over their longer faces and in view of the manner in which the sectors are rejoined the composite lumber product will likewise have vertical grain over the two longer faces. Consequently all of the lumber products manufactured according to the present invention can have vertical grain over their width dimension. This then results in an improved lumber product because of enhanced dimensional stability as a result of the composite product grain structure. Upon changes in moisture conditions vertical grained lumber will have generally more uniform dimensional changes than a piece of flat grained lumber having the said dimensions.

In terms of flexibility of dimensions for lumber products it is apparent for example that when a log is only 6 inches in diameter 2 inches × 10's will not be possible as solid pieces of cut lumber. In the prior art, however, various pressing and gluing processes are available to then make a composite 2 inches × 10 inches piece by edge gluing two or more smaller pieces together to yield the desired dimension. While this method does yield larger dimension lumber from smaller diameter logs the resulting composite pieces are generally of nonuniform grain structure and do not have good dimensional stability. With the process of the present invention an edge bonding technique can also be utilized and the resulting dimensioned products do in fact have the uniform grain structures that are necessary for dimensional stability.

Accordingly, from the foregoing, it is apparent that one primary object of the present invention is to convert logs into composite lumber products whereby the percentage of log volume converted to lumber product is substantially increased.

Another primary object of the invention is to manufacture composite lumber products that have improved and more uniform quality.

Yet another main object of the present invention is to convert the logs of generally smaller diameter into composite lumber products.

These primary objects and others will become more apparent and better understood upon reading the following specification in conjunction with the attached drawing.

SUMMARY OF THE INVENTION

Briefly, this invention is practiced in one form by cutting a log segment radially into a plurality of sector shaped pieces and then selecting two sectors and inverting them so that the thin edge of the first is approximately adjacent the thick edge of the second. The pair of sector pieces so positioned are then adhesively bonded together to produce a composite member which can then be machined into the desired shape. The resulting composite product has a vertical grain pattern along its two longer faces.

DESCRIPTION OF THE PREFERRED EMBODIMENT

Prior Art

Figure 1:
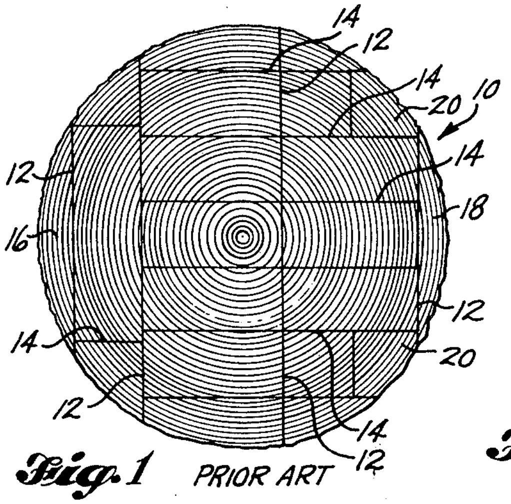
Fig. 1 PRIOR ART
FIG. 1 is a cross-sectional view through a typical small log showing a cutting pattern that would be representative of the prior art.

Before beginning with a description of the preferred embodiment, it will be helpful for a complete understanding of the present invention to offer a brief description of the prior art as shown in the drawing. The vertical and horizontal lines depicted on the cross-section of the log segment, generally designated at 10 in FIG. 1, represent a typical cutting pattern for a relatively small log. Any suitable cutting machine that is available to a sawmill can be used to make the indicated cuts. For example, the longitudinal vertical cuts 12 could be made by a standard band saw, while the horizontal cuts 14 could subsequently be made by a suitable edging machine or gang saw. When cutting the cylindrical log 10 in such a manner into rectangular pieces of lumber, it is apparent that certain portions of the log volume will necessarily be excluded from the final pieces of lumber. For example, on the primary vertical cuts 12 made to the log 10, two slabs, 16 and 18 respectively, are removed from the log. Slabs 16 and 18 are generally unfit for the production of lumber and normally are sent to a waste burner or to a chipping machine to be converted to pulp chips. Likewise, when the horizontal cuts 14 are made additional wood volume is excluded from the remaining volume available for lumber. This volume, each piece being designated by the reference number 20 (collectively called edgings), is likewise normally fed to a burner or chipping machine. Thus a substantial amount of wood volume is removed from the log 10 essentially in a taper removing and squaring up process so that rectangular pieces will result.

Figure 2:
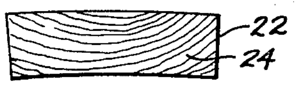
Fig. 2 PRIOR ART
FIG. 2 is a cross-sectional view through a piece of flat grained lumber showing cupping due to differential shrinkage upon drying.
Figure 3:
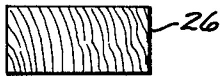
Fig. 3 PRIOR ART
FIG. 3 is a similar cross-sectional view taken through a piece of vertical grained lumber.

In FIG. 2 a typical grain orientation is depicted that results from the cutting pattern of FIG. 1. The rectangular piece of lumber designated as 22 has a flat grain pattern wherein the concentric annual rings 24 are generally parallel to the width dimension. It will be noted that the piece of lumber 22 has a slight curvature and is to depict the warpage or cupping that can result upon drying of flat grained lumber. This is the result of the inherent property of flat grained wood having non-uniform shrinkage causing drying stresses as previously noted. The cross-sectioned piece of lumber 26 shown in FIG. 3 depicts a typical vertical grain pattern. In this instance, the dimensional variations upon drying are relatively reduced in view of the more uniform drying stresses of vertical grain lumber.

Figure 4:
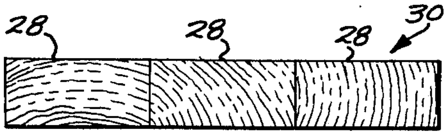
Fig. 4 PRIOR ART
FIG. 4 is a cross-sectional view taken through a composite piece of edge bonded lumber.

In FIG. 4 several pieces of lumber, each indicated by reference number 28, have been bonded together edgewide in order to form a composite piece 30 having a wider dimension. Preferably each piece of lumber 28 is of a similar thickness. The wide dimension composite piece can then be machined to the finally desired dimensions.

In terms of lumber production of lumber yield from a cylindrical log based on nominal dimensions, a standard generally accepted yield for relatively small diameter logs is on the order of 600 board feet (BF) per hundred cubic feet (CCF) of log volume. This is based on the industry standard that the nominal dimensions of a dry finished board foot are ¾ inch × 11-¼ inch × 12 inches thereby theoretically offering a yield of about 1,700 BF/CCF of log. Certain losses, such as shrinkage, saw kerf, and surfacing, will account for a portion of the difference in yield between actual and theoretical. The other large portion of the difference is the result of squaring-up and taper removing loss. The present invention can increase yields of composite lumber to something on the order of 1,100 to 1,200 BF/CCF; thus, it will be appreciated that substantial improvements in the yield up to 100% can be realized which are due basically to the cutting and rejoining procedure.

Basic Process

Figure 5:
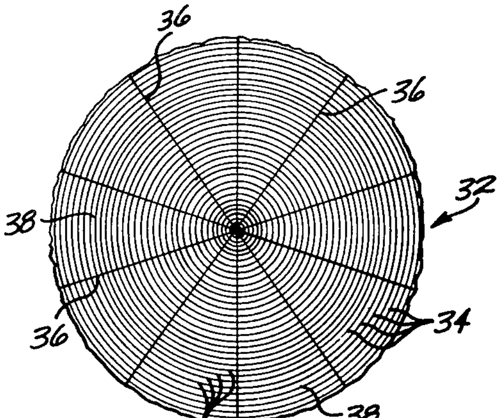
FIG. 5 is a cross-sectional view through a typical small log showing a cutting pattern that is representative of the present invention.

Shown in FIG. 5 is a cross section through a cylindrical log segment depicted generally at 32, having the plurality of concentric annual rings 34, spaced radially from the center of log 32. Imposed over the cross section of log segment 32 are a series of straight lines 36 meeting at the center of log 32. For the purpose of describing the basic process it is assumed that the log segment of FIG. 5 is a perfect straight cylinder with no taper. It will be appreciated that this will normally not be the case and a description of the method to compensate for taper and other variables such as log diameter will be given later. The straight lines 36 imposed on the cross section of log 32 represent a typical cutting pattern for producing sector or wedge shaped pieces 38 that are required for carrying out the subsequent steps of the present invention.

The sector shaped pieces 38 cut from log segment 32 will preferably be equally sized, that is, the small included angle $\theta$ will be the same for each sector 38 cut from a particular log. Depending upon the desired thickness of the composite lumber product a certain predetermined number of equal sized sectors will normally be cut from a log of given diameter. The sizing of sectors for given log diameters will be more fully described later.

Figure 6:
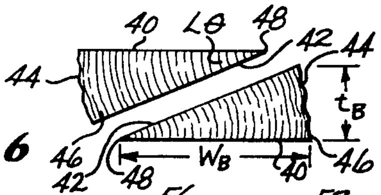
FIG. 6 is a cross section taken through two sector shaped pieces showing their positions relative to each other just prior to rejoining.

In FIG. 6 two sector pieces 38 are shown in spatial relationship to one another just prior to being adhesively bonded together. Of course, it is apparent that the sector pieces 38 will extend for some longitudinal distance depending upon cross cutting schedules for the tree stems. The radial faces of the sector pieces 38 are indicated as 40 and 42 respectively, face 40 being the left radial face and face 42 the right radial face if each sector is standing vertically on its thick edge. The tangential face is indicated at 44, the thick edge at 46, and the apex or thin edge of each sector is indicated at 48. It is to be noted that in its present configuration the tangential face 44 is comprised of a portion of the curvilinear circumference of the log surface. The basic thickness of a sector 38 is indicated at $t_B$ and the basic width of a cut sector is indicated as $w_B$. The subscripts are used to designate basic dimensions and it will be understood that these dimensions can change depending on whether they are for green freshly cut sector pieces or dried and surfaced sector pieces.

In bonding two sectors together to form a sector pair it is apparent from FIG. 6 that one sector piece 38 is reversed with respect to the other such that the thin edge 48 of one is generally adjacent the thick edge 46 of the other. When the two preselected sectors 38 are bonded together to form a composite member, indicated at 50 in FIG. 7, they will form generally the shape of a parallelogram. Two opposing radial faces 40 or 42 will meet along the diagonal bonding line indicated at 52 with the $t_B$ and $w_B$ dimensions of the composite member 50 being the same as an individual sector shaped piece 38 except that instead of being triangular it is now twice the volume and has a quadrilateral shape. The radial faces 40 or 42 of each sector not forming the bonding line 52 will form two of the external faces of the composite member 50 while the tangential faces 44 will form the other two external faces.

In rejoining the sector pieces 38, a strong adhesive system is employed to form the composite member 50. A suitable known adhesive used in the wood products industry can be employed such as a phenol-resorcinol-formaldehyde composition, and the rejoining process is simply one of spreading an adhesive surface on two opposed radial sector faces 40 or 42 and then positioning them together to form the bonding line 52. Head and/or pressure in any suitable press apparatus can then be applied to cure the bonding line of the composite member 50.

Figure 7:
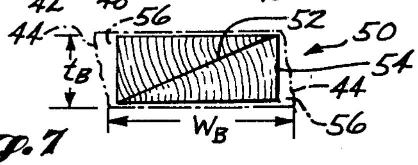
FIG. 7 is a cross section taken through two rejoined sector shaped pieces showing a finally machined rectangular product.

The perfect rectangle indicated by the solid lines in FIG. 7 and designated by the reference number 54 represents a finished composite lumber product that can be machined from the adhesively bonded together sector shaped pieces 38. While the radial sector faces 40 and 42 are generally flat, having been cut by the sector cutting apparatus, the tangential faces 44, prior to machining, are curvilinear since they are portions of the log's natural circumference. The machining process to yield the composite lumber product 54 can be accomplished through any suitable known means; such as, a planer that makes finished smooth surfaces on rough lumber. Of course, the machining step will form the rectangular piece of lumber 54 into the desired dimensions, for example, into a piece of standard dimension lumber. It is apparent from FIG. 7 that a vertical grain pattern will result over the width dimension of the composite product 54 and along its entire length.

It is to be noted that prior to rejoining the sector pieces 38 they will preferably be dried by a suitable known method; such as, by passing them through a lumber dry kiln and causing them to dry to the desired moisture content. As was mentioned previously, since the grain pattern of the sectors is substantially vertical, the drying stresses and resultant distortions will be minimized. Consequently, when the sectors come from the dryer they will be less affected by dimensional changes such as cupping than a comparably sized piece of plain sawn or flat grained lumber.

Also, prior to adhesively bonding the sectors together any desired surfacing and/or trimming operation can be performed. For example, defects such as large spike knots can be cut from the individual sectors. As noted previously, small defects are relatively inconsequential due to the randomizing effect that the rejoining step has on defects. Also, at this stage of the process, if the log segment has taper and if the decision is made to remove the natural taper from the sector piece, each sector 38 can be machined longitudinally along the thick edge 46 to form sectors of uniform dimension along their length. As will be described later, additional increases in lumber yield can be obtained if the natural taper is utilized; that is, if the wood volume contained in the tapered portion relative to a perfect right cylinder projected through the small end diameter is arranged to become a portion of the composite member 50. Of course, it will be appreciated that if a cut or machining is made to eliminate taper then the curvilinear tangential face 44 of the sector can be eliminated prior to the rejoining step.

Another step in the present process which is also a traditional step in existing lumber manufacturing processes is that of sorting and grading. Grading is done according to wood quality and defects. Grading assumes various forms and can be done just after the cutting step, after the final machining and also prior to cutting where log quality is graded with off-grade logs being diverted from the process altogether. Sorts are made after cutting for the sector angle $\theta$, the sector width $w_B$, and sector length if a standardized length is not being cut. Sorts are also made for log diameters prior to the first longitudinal cut. It should be apparent that logs within a given diameter range will be cut in a similar manner in order to simplify the subsequent procedures of the process. Thus, graded incoming logs will be segregated into diameter classes for a particular product to be manufactured. Once the cutting apparatus is set for a specific cut within a diameter range for a desired end product, only these cuts will be made during the desired run or until a different log diameter is to be cut.

Figure 8:
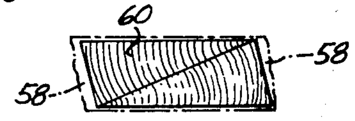
FIG. 8 is a cross section taken through two rejoined sector shaped pieces showing a machined parallelogram as an alternative to machining a rectangle.

While the composite member 50 could be machined into the perfect rectangular lumber product 54 and then bonded edgewise as in FIG. 4 to form wider dimensions it results in excessive loss due to nonuse of wood volume that could otherwise be utilized to increase lumber yield. This loss is designated in FIG. 7 by the reference number 56. The opposed tangential faces 44 of the composite member 50 are, of course, at an angle, other than 90° from the faces that form the other two parallel sides of composite member 50. Instead of machining the two tangential faces 44 to square them up with the other faces they can be machined so as to remove only the irregularity due to the curvilinear surface. This loss is substantially less than that contained in 56 and is designated in FIG. 8 by reference number 58. The angle of faces 44 will remain offset from 90° but they will be machined so as to form a perfect parallelogram. The composite member having been machined in such a manner is depicted as 60 in FIG. 8.

Figure 9:
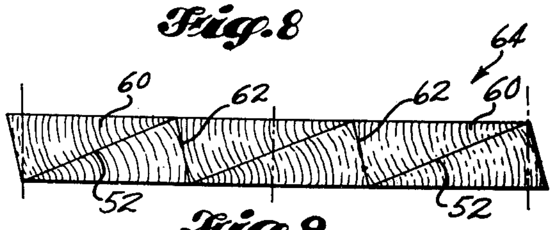
FIG. 9 is a cross section taken through a plurality of edge bonded sector pairs showing longitudinal planes for exemplary ripping cuts.

Next a plurality of composite members 60 each being two sector pieces 38 joined to form a sector pair are bonded together edgewise at bonding lines 62 to form the wide composite member indicated at 64 in FIG. 9. This edge bonding step can be carried out in the same manner as if bonding rectangular shaped pieces edgewise and can be done on commercially available equipment. The composite member 64 can be made as wide as is desired within machinery constraints and then ripped longitudinally into lumber products having the desired width dimensions. In this manner wider dimensions are available from smaller logs and also the only loss due to squaring up will be at the ends of the composite member 64. As more composite members 60 are joined together the resultant loss at the ends of member 64 decreases. The wide composite member 64 shown in FIG. 9 has a proposed cutting pattern (vertical lines) superimposed over it to indicate how the composite member 64 might be ripped into rectangular pieces of lumber having the desired width.

Sector Cutting Apparatus

Figure 11:
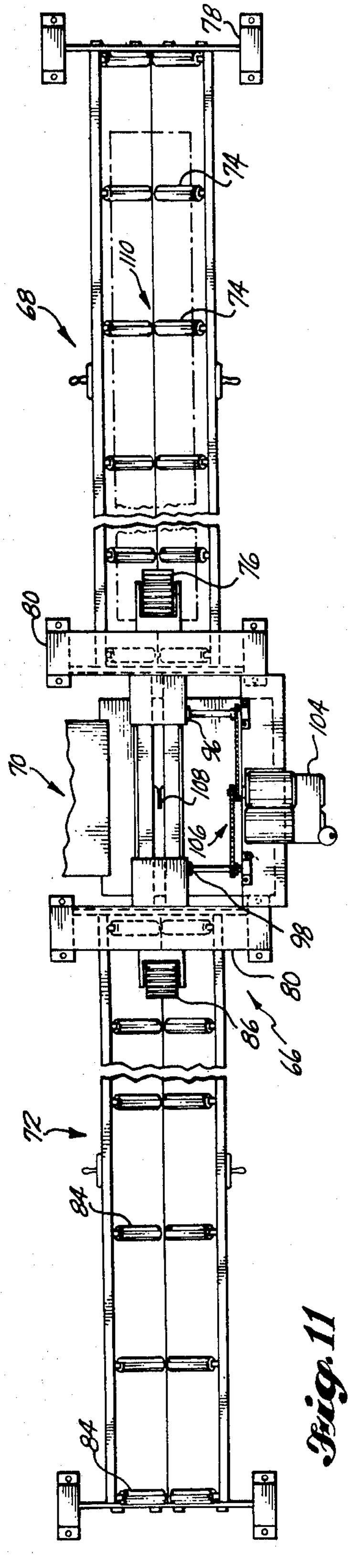
FIG. 11 is a top plan view of the cutting machine.
Figure 12:
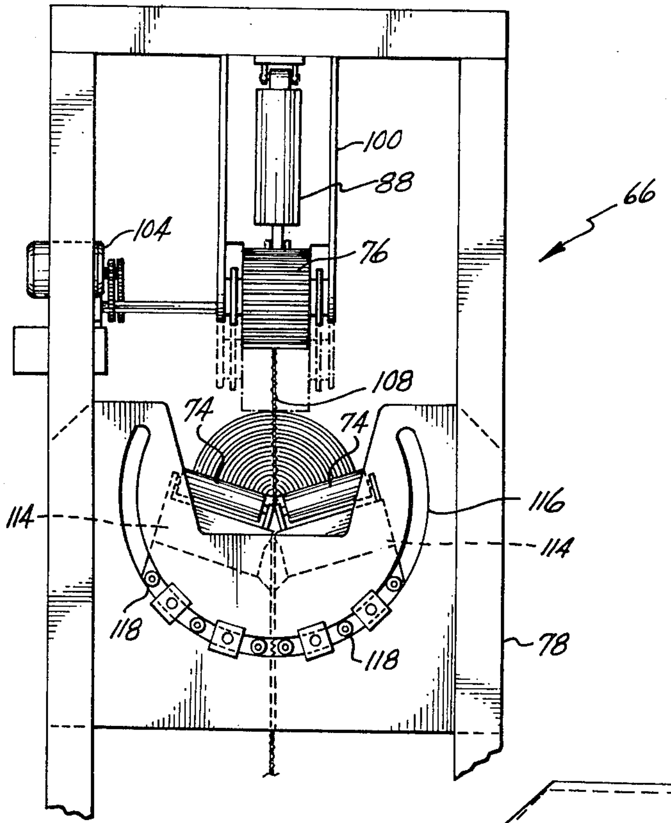
FIG. 12 is an end view of the cutting machine.

By referring to FIGS. 10–12, a convenient sector cutting apparatus will be described. While it is apparent that the cutting apparatus is essentially a sawing machine, it should be understood that the process of the present invention is not limited to a sawing step in forming the sectors. The present technological state of wood cutting is, however, best represented by the sawing apparatus generally designated at 66. The basic capability of sawing apparatus 66 is for producing two sector pieces 38 where the angle $\theta$ of each will be something less than 90°. The first major halving and quartering cuts can be made on any suitable band or circular saw that is commercially available for log breakdown.

Figure 10:
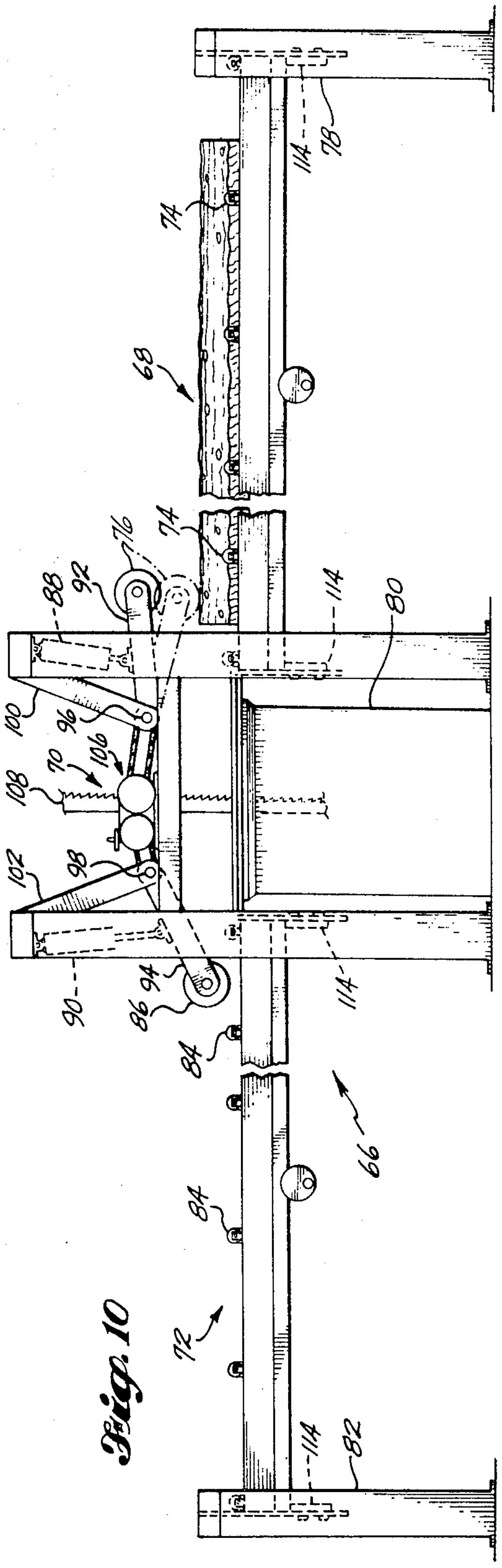
FIG. 10 is a side elevation view of an appropriate cutting machine for sawing logs into sector shaped pieces.

The side elevation view of the cutting apparatus 66 depicted in FIG. 10 is comprised essentially of an infeed section 68, a sawing section 70, and an out-feed section 72. Providing the feeding capability at the infeed section 68 can be a plurality of powered rolls, each indicated at 74, and a top powered feed roll 76. The infeed section 68 is, of course, supported on a suitable frame indicated generally at 78; likewise the sawing section 70 is supported on a suitable frame indicated generally at 80, and the out-feed section 72 is supported on a frame indicated at 82. Similarly to the infeed section 68, the out-feed section 72 has a plurality of powered out-feed rolls 84 that operate to carry the two cut sectors 38 away from the sawing section 70. The top powered out-feed roll 86 operates similarly to the feed roll 76, such that the top portion of the large incoming sector and the two smaller outgoing sectors are stabilized within and atop the plurality of powered rollers 74 and 84 respectively. The two top powered feed rolls 76 and 86 have the capability of automatically adjusting themselves vertically in order to accommodate the varying sizes of logs or sectors passing through the sawing apparatus 66. This capability is provided through actuating cylinders 88 and 90 operating the top powered rolls 76 and 86. Each top powered roll 76, 86 is rotatably mounted within pivotal arm members 92 and 94 respectively. The arm members 92, 94 are in turn mounted at pivot points 96 and 98 respectively such that the actuating cylinders 88 and 90 can operate to move the arm members 92, 94 and consequently the top powered rolls 76 and 86. Additional supporting arms 100 and 102 can be appropriately positioned to offer additional strength and rigidity to the pivot points 96 and 98. The drive means indicated at 104 operates to turn the top powered rolls 76 and 86 through an appropriate belt and drive shaft mechanism indicated generally at 106. The actuating cylinders 88 and 90 will act to exert an appropriate amount of pressure on the top of the sectors. This relationship will allow the sectors to pass through the sawing section 70 and the out-feed section 72 in a sufficiently stabilized manner. The cutting is effected at the sawing section 70 through a typical band aaw 108 without an inordinate amount of deviation from straight lines cuts. For initial halving or quartering cuts to the log a conventional carriage type saw is also suitable.

In order to cut sectors for a predetermined angle $\theta$ which can vary, appropriate means must be provided for positioning the larger incoming sector in proper relationship to the band saw 108. Referring primarily to FIG. 12, it will be seen that the plurality of powered infeed rolls 74 comprising the in-feed section 68 are positioned in an adjustable V-type arrangement generally indicated at 110. The powered rolls 74 are supported in their V-type arrangement by independent tiltable frames 112 and 114. The two tiltable frames are mounted on a curvilinear track 116 through a plurality of bearings each indicated as 118. A suitable adjusting mechanism and control system (not shown) is operable to adjust the included angle between the powered rolls 74 and to set the larger incoming sector at the proper position for the desired resulting smaller sectors.

The sector pieces 38 resulting from the first longitudinal cutting in the sawing apparatus 66 can then be directed to a similar sawing apparatus positioned downstream from the out-feed section 72 of the first sawing apparatus. Succeeding cuts in separate sawing machines producing progressively smaller sized sectors is readily adaptable to the present process, and in fact, offers an efficient in-line easily programmed method of producing the ultimately desired sector sizes. Again, however, it should be noted that a single sawing apparatus 66 can ultimately produce the final sized sector by a series of successive longitudinal cuts of a large sector piece. Subsequent to the sector pieces 38 being cut by the sawing apparatus 66 they are conveyed to the next processing station on their way to becoming parts of the composite lumber products.

Sector Sizing

The finally desired lumber product is the basic consideration for selecting the sector size as it will be cut from a given log diameter. Assume that the final product is to be a standard size 2 × 8 piece of lumber 8 feet long having a nominal 1-½ inch finished thickness and a 7-½ inches finished width. Assume, too, that the diameter of a particular log is only 6 inches and that it is a perfect right cylinder (no taper) cut to an 8-foot length. Of course, it will be recognized that with such a small diameter log it will be impossible to cut sector pieces that can be rejoined into sector pairs and then squared up by machining to a 7½ inches discreet width. The maximum width dimension available for a 1½ inch two sector composite product from a 6 inches log would be on the order of 2½ inches, considering losses due to squaring up, kerf, shrinkage, and surfacing. Thus it is apparent that if 7½ inches wide products are to be manufactured from 6 inches logs it will be necessary to edge glue the formed composite parallelograms 60 together and then rip cut the wide composite member 64 longitudinally to the 7½ inches dimension.

Sector sizing can be approached in several ways with practical considerations dictating the most desirable sizing method. One method, that will be only briefly mentioned, sizes the sector pieces based on both the known thickness and the known log diameter. For example, with a 6 inches log the sector angle will be determined by the formula $\sin \theta = T/R$ where T is sector height without losses and R is the log radius without losses. These relationships will become apparent when referring to FIG. 13. R will be 3 inches while T will be equal to 1½ inch plus the assumed losses due to saw kerf, shrinkage, and surfacing. These losses will be approximately 0.26 inch representing a 0.1 inch kerf loss, a 0.1 inch shrinkage (tangential) loss, and a 0.06 inch surfacing loss. Thus $\sin \theta = 1.76/3.00 = 0.058$ and from standard tables angle $\theta$ therefore equals 36°. Thus with this method the sector angle $\theta$ will be determined for each diameter without regard to whether the cutting program will yield an even number of sector pieces or an odd number.

Practical considerations dictate a cutting program on sawing apparatus 66 resulting in an even number of sector pieces 38; the reasons being to require fewer sorts for sector size after cutting but principally to simplify the cutting program. Consequently, the known quantities will now be sector angle $\theta$ and desired thickness of the finished product (height of sector). If an even number of sectors are to be cut, angle $\theta$ is then known for each even number of cuttings. For example, 10 sectors cut from a log will offer a sector angle $\theta$ of 36°. The same formula applies, i.e., $\sin \theta = T/R$; however, as mentioned the unknown quantity is R or ultimately the log diameter. In the example, solving for R where T and $\theta$ are known results in $R = T/\sin \theta = 1.76/0.586 = 3$ inches, or the log diameter must be 6 inches. For any reasonable even number of cuts a table can be prepared showing the cutting program when the final desired product has a finished 1-½ inch thickness.

TABLE I

CALCULATED LOG DIAMETERS

| No. of Sectors | Angle $\theta$ | Log Diameter |
|---|---|---|
| 8 | 45° | 5.0" |
| 10 | 36° | 6.0" |
| 12 | 30° | 7.0" |
| 14 | 25.7° | 8.1" |
| 16 | 22.5° | 9.2" |
| 18 | 20° | 10.3" |
| 20 | 18° | 11.4" |

This table is exemplary and could be extended for larger diameter logs and likewise could be completed for any odd number of cuts. This same procedure can be followed for determining a cutting program if a product of different thickness is desired.

Figure 14:
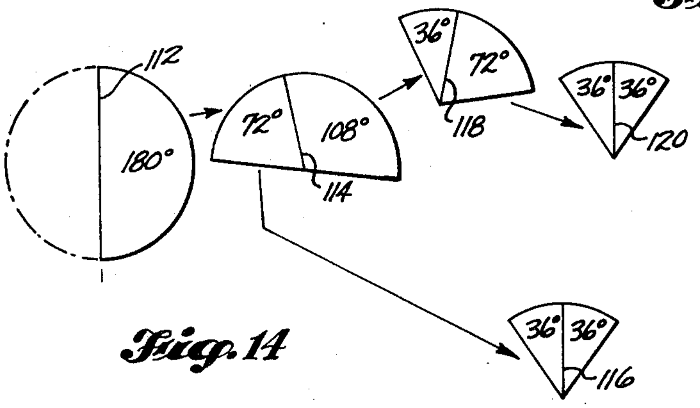
FIG. 14 is a schematic representation showing a cutting pattern for producing ten sectors from a log.

FIG. 14 shows an exemplary cutting pattern for setting sector sawing apparatus 66 where the desired angle $\theta$ is 36°. As seen from the above table the corresponding log diameter will be 6 inches. The first cut will be a halving cut through longitudinal plane 112. Each half of the log is then cut along longitudinal plane 114 with the two resulting sector pieces having angles of 72° and 108°. Since the ultimately desired sector angle $\theta$ is 36° the 72° sector piece can be cut in half through plane 116 yielding two sector pieces 38, each with $\theta = 36°$. The 108° sector must be cut twice more with the first of these cuts being along plane 118 and resulting in a desired 36° sector and a larger 72° sector. The 72° sector is then cut along plane 120 to yield the two final 36° sector pieces. With this cutting program and cutting for a 1-½ inch product the 6 inches log is cut into ten equally sized sector pieces 38. The sectors are then prepared for the subsequent steps in the process and ultimately comprise the parts within the composite lumber product.

Since the desired product of our example is a standard 2 × 8 it will be necessary to edge bond the sector pairs (parallelograms 60) together into wide composite members 64. Additional logs 6 inches in diameter will be cut according to the above program in order to form even wider composite widths, thereby allowing many 2 × 8's to be rip cut from the wide composite member. Since the logs were all cross cut to nominal 8 foot lengths prior to being passed through the cutting apparatus 66 the final product will be of standard size. If, however, longer product lengths are desired the 8 foot long composite 2 × 8's can be finger or scarf jointed and bonded together into any desired longer length.

Equivalent Lumber Yield

Figure 13:
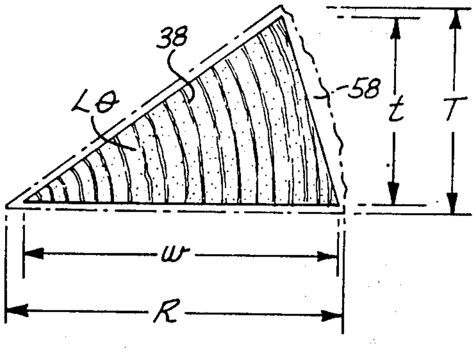
FIG. 13 is a cross-sectional view of a typical sector piece depicting pertinent dimensions.

In calculations for determining lumber yields from relatively small diameter logs using conventional sawing processes the most optimistic yield from a 6 inches log was about 600 BF/CCF. This yield was from an optimizing computer program for various log diameters that essentially determined the best cutting pattern. In calculating yields derivable from log segments cut and processed according to the present invention an example will be presented that will aid one skilled in the art to understand and calculate lumber yield. Again a 6 inches diameter log segmented 8 inches long with no taper will represent the exemplary log for a cutting program that yields ten equal sized sector pieces with the finally desired product thickness being 1-½ inch. Referring to FIG. 13, the dried sector pieces 38 as in the final composite lumber product will have (radial losses being approximately 0.1 R) a *w* dimension of 2.70 inches and a *t* dimension of 1.50 inch. When the 10 sectors are bonded together, that is, where the five sector pairs (parallelograms 60) are edge bonded together to form the wide composite member 64, the actual wide width dimension (W) will be 13.50 inches (5 × 2.70 inches).

Figure 15:
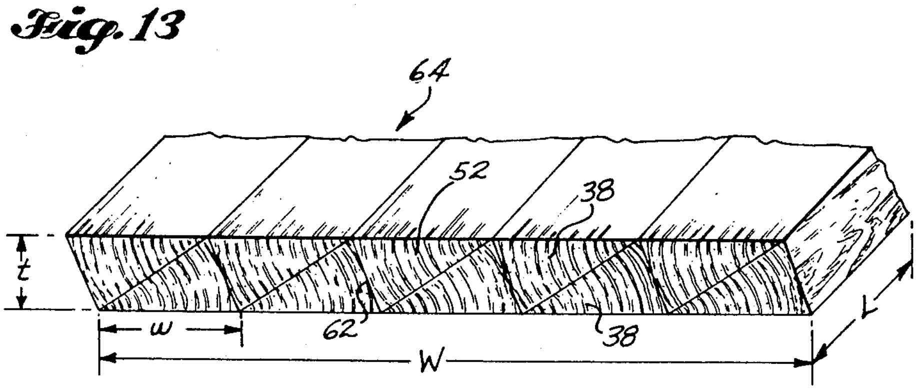
FIG. 15 is an isometric view of a plurality of edge bonded sector pairs depicting pertinent dimensions.

As noted previously the nominal dimension of one board foot of lumber is ¾ inch × 11-¼ inches × 12 inches which will be the standard, as is well known to those skilled in the art, for yield calculations. First, the board footage in the eight foot long composite member 64 ($BF_{CM}$) will be determined. This is equal to the thickness (t), multiplied by the wide width (W), multiplied by the length of the composite member (L), all divided by the volume of one board foot ($V_{BF}$); these dimensions can be clearly seen by referring to FIG. 15 and stated as a formula:

$$BF_{CM} = t \times W \times L/V_{BF} \qquad (1)$$

and for the example, $BF_{CM}$ = 1.50 inch × 13.50 inches × 8.00 foot/0.75 inch × 11.25 inches × 1 foot = 19.20 Second, the volume of wood in cubic feet ($V_{log}$) within the log segment, is calculated according to the standard formula, in which (A) is log cross sectional area in sq. in. and (L) is the length in inches:

$$V_{log} = A \; X \; L/1728 \qquad (2)$$

and for the example, $$V_{log} = (3.14)(9)(96)/1728 = 1.57 \; CF$$

Third, the yield in board feet of lumber per cubic foot (BF/CF) or hundred cubic feet (BF/CCF) of round log volume is determined simply by dividing the calculated board footage ($BF_{CM}$) of the composite member 64 by the calculated volume and for the example:

$$BF/CF = 19.20/\mathbf{1.57} = 12.20 \text{ or} \qquad (3)$$

$$BF/CCF = 12.20 \times 100 = 1220$$

This value of composite lumber yield from the exemplary log segment is about twice that of the most optimistic prior art yield for the same log. It should be noted that a small loss will be incurred when ripping the wide composite member 64 to the desired width dimension but it is relatively minor and is essentially all kerf loss.

Diameter Ranges and Taper

The log mix that is available to a lumber manufacturer has fluctuations in diameter, taper, and other aberrations. The exemplary calculated diameter of Table I represent the optimum predetermined sizes for the other given or known conditions. Similarly, in the previous examples taper was not considered nor were other aberrations such as sweep. It is one object of the present invention to consider these deviations from optimum logs and to provide flexibility in the process in order to account for the deviations. The basic goal being that as much wood volume as possible should be converted into the composite lumber products.

Looking at deviations in diameter first it will be recalled that when cutting an even number of sectors they were sized so that the desired *t* dimension would always result whatever the log diameter. The diameter deviation results in a situation where the actual log diameter does not fall on one of the optimum calculated diameters. Assume that a log 5.70 inches in diameter will be the real log that is to be cut into sector pieces for subsequent processing according to the present invention. Looking at Table I the closest optimum is a 6 inches log and such optimum logs are cut ten times with an angle $\theta$ of 36°. If the 5.70 inches log were cut ten times the resulting *t* dimension would not equal that required for a 1-½ inch lumber product; it would be less. Alternatively, the 5 inches optimum diameter yields eight sectors and if the 5.70 inches log were cut into eight sectors the resulting *t* dimension would be too large. There are several alternatives, the most obvious being to cut eight sector pieces as if cutting a 5 inches log and then machine them down for the proper *t* dimension. This, of course, results in a significant loss in lumber yield due to the machining step.

Figure 16:
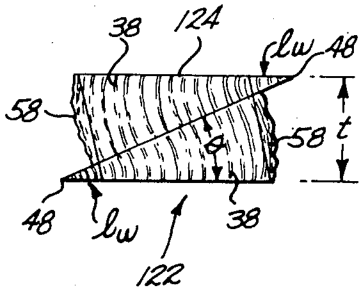
FIG. 16 is a cross section through a pair of undersized sectors slipped to the desired thickness.

Two other alternatives convert a higher portion of the wood volume in a sector piece into the composite lumber member. One of these alternatives is to cut the 5.70 inches log as if it were actually a 6 inches log, that is, into ten undersized sectors. As a consequence angle $\theta$ is 36° and the resulting *t* will be less than that required for the 1-½ inch product. In order to increase the *t* value, the sectors are slipped along their radial faces 40 and 42 toward one another thereby increasing the *t* but decreasing the final width of the sector pair. FIG. 16 illustrates this method of rejoining and slipping two sector pieces 38 such that the desired *t* results. The resulting composite member, generally indicated at 122, is then machined into the true parallelogram 124 for subsequent edge bonding with the loss at each thin edge 48 due to the machining step designated as $\mathbf{1}_w$ on FIG. 16.

Figure 17:
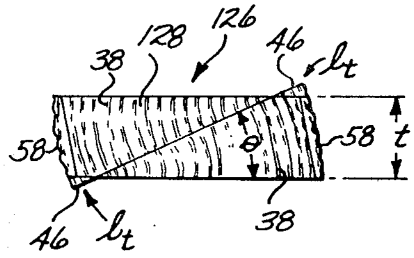
FIG. 17 is a cross section through a pair of oversized sectors likewise slipped to the desired thickness.

Another alternative is to cut the actual log segment into eight sectors as if it were a 5 inches log with angle $\theta$ then being equal to 45°. In this instance, in order for the desired *t* to result the sector pieces 38 must be slipped along their radial faces 40 and 42 away from one another thereby increasing the width while decreasing the *t*. FIG. 17 illustrates this method of rejoining two sector pieces 38 that have been oversized by the cutting procedure but slipped along the opposing faces to yield the finally desired *t*. The sectors will preferably be machined to eliminate the excess thickness at the thick edge 46 prior to the bonding step that forms the sector pairs. This loss in wood volume is designated on FIG. 17 as $\mathbf{1}_t$ with the overall composite member being generally indicated at 126 with the true parallelogram that is formed being indicated at 128.

Yield calculations can be made similarly to the example given for the 6 inches optimum diameter log except that the losses, $l_t$ and $l_w$, for each alternative will be considered. The yield will be reduced accordingly but not as significantly as in the first mentioned alternative. Table II below summarizes the yields for long diameter that fall within a diameter range and where the sector pairs have been edge bonded together. Also, Table II indicates which alternative, oversized sectors or undersized sectors, gives the most yield within a particular diameter range as compared to the optimum log diameter for the known angle $\theta$. The values in Table II should be taken as close approximations only since assumptions were made for the calculations that can vary.

TABLE II

DIAMETER RANGE AND CALCULATED YIELDS

| Diameter Range | Number of Sectors Cut - Angle $\theta$ | Yield (BF/CCF) |
|---|---|---|
| 4.0" | | 1100 |
| 4.5" | 8 – 45° | 1159 |
| 5.0" | | 1173 |
| 5.0" | | 1173 |
| 5.5" | 10 – 36° | 1212 |
| 6.0" | | 1220 |
| 6.0" | | 1220 |
| 6.5" | 12 – 30° | 1250 |
| 7.0" | | 1257 |
| 7.3" | | 1255 |
| 7.3" | | 1252 |
| 7.6" | 14 – 25.7° | 1262 |
| 8.1" | | 1268 |
| 8.4" | | 1266 |
| 8.4" | | 1264 |
| 8.7" | 16 – 22.5° | 1271 |
| 9.2" | | 1275 |
| 9.5" | | 1274 |
| 9.5" | | 1273 |
| 9.8" | 18 – 20° | 1278 |
| 10.3" | | 1282 |
| 10.6" | | 1281 |
| 10.6" | | 1279 |
| 10.9" | 20 – 18° | 1284 |
| 11.4– | | 1287 |

The wood volume within the tapered portion of a log, that is, the wood fiber outside the circumference of the perfect right cylinder through the smaller end, has normally been considered nonconvertible to lumber product. Since the sector pieces as they are cut from log segments will usually have taper volume, it is desirable to have a method of converting at least a portion of this wood volume to composite lumber product. Of course, it will be recognized by referring to FIG. 18 that in order to save as much as possible of the taper volume, one of the sector pieces 28 in the pair can simply be reversed longitudinally prior to the step of bonding the radial faces together.

Figure 18:
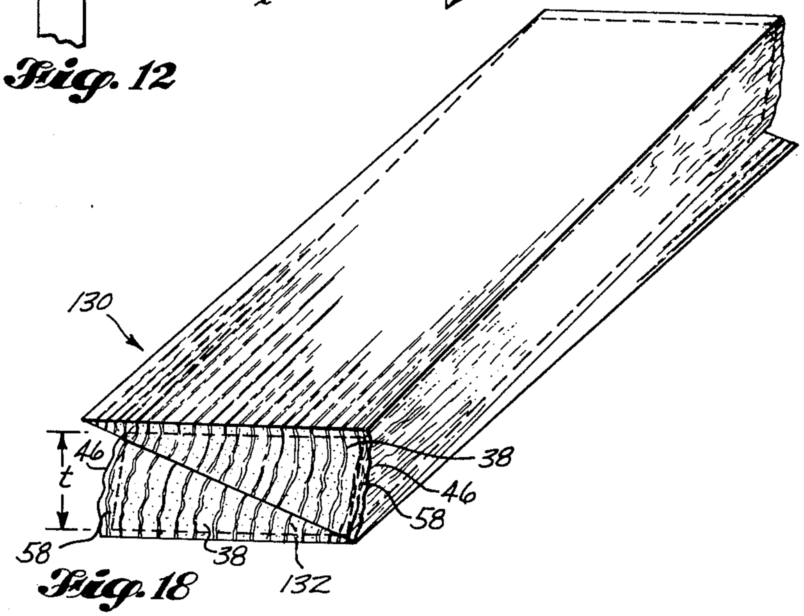
FIG. 18 is an isometric view showing two sector pieces that have been reversed to capture taper.

The rejoining process for sector pieces having taper will be the same with every two sector pieces to be rejoined into a sector pair reversed longitudinally. The two sector pieces 38 are then slipped accordingly to yield the desired *t* dimension along their composite length prior to allowing the adhesive to cure. After the composite member, designated as 130 in FIG. 18, is fully cured the curvilinear thick edges 46 can then be machined back to form a perfect parallelogram or sector pair indicated as 132. Parallelograms 132 are then utilized for edge bonding according to the basic process.

To better understand the method employed within the process for converting taper volume into lumber product exemplary numerical values will be given. As a basic assumption the taper will be 0.125 inch per foot for log and will be uniform over the eight foot long log segment. Thus when the small end diameter is 6 inches the large end diameter will be 7 inches, or if the small end happens to be 5-½ in diameter the large end will have a 6-½ diameter. Just as the losses in yield due to log diameters falling off of the optimums (for a given angle $\theta$) had to be subtracted in the yield calculations it will be recognized that an addition for taper volume will be made. In accounting for taper and the diameter ranges the factor that varies in the primary yield equation (1) is W. The width of each sector pair (composite parallelogram) from a particular log will be derived based on calculations that account for the gain in W from taper and the loss in W from diameter range. Also, the equation (2) for log volume is modified in order to calculate the volume of a log segment with taper.

Accordingly Table III can be prepared and appears below to indicate yield values for log segments of certain diameters within indicated ranges having an assumed taper of 0.125 inch per foot of log. The sector pairs have been edge bonded into a wide composite member similar to member 64 shown in FIG. 15.

Table III

TAPER AND CALCULATED YIELDS

| Diameter Range (Diameter at Small End) | Number of Sectors Cut - Angle $\theta$ | Yield (BF/CCF) |
|---|---|---|
| 4.0" | 8 – 45° | 1154 |
| 4.5" | | 1170 |
| 4.5" | | 1170 |
| 5.0" | 10 – 36° | 1208 |
| 5.5" | | 1220 |
| 5.5" | | 1220 |
| 6.0" | 12 – 30° | 1247 |
| 6.5" | | 1255 |
| 6.8" | | 1253 |
| 6.8" | | 1250 |
| 7.0" | 14 – 25.7° | 1258 |
| 7.6" | | 1266 |
| 8.0" | | 1263 |
| 8.0" | | 1265 |
| 8.1" | 16 – 22.5° | 1268 |
| 8.7" | | 1274 |
| 9.0" | | 1273 |
| 9.0" | | 1271 |
| 9.2" | 18 – 20° | 1276 |
| 9.8" | | 1281 |
| 10.1" | | 1280 |
| 10.1" | | 1278 |
| 10.3" | 20 – 18° | 1282 |
| 10.9" | | 1286 |
| 11.4" | | 1284 |

Other aberrations that occur in a log segment such as sweep will tend to lower the yield values as stated in Tables II and III because additional machining will be necessary to provide flat surfaces. However, it will be appreciated that even with some additional small losses the composite lumber product yields are much greater than those obtained by prior art cutting methods.

While a detailed description of the basic process has been described together with certain additions and variations to offer flexibility, it is understood that many additional changes and modifications may be made to the sector cutting and rejoining process without departing from the spirit of the invention. All such modifications are intended to be included within the scope of the appended claims.

I claim:

1. The process for making composite lumber products from generally cylindrical logs comprising the steps of:

cutting at least one log radially into a plurality of sector-shaped pieces, selecting two sector-shaped pieces with each having substantially the same included angle between their radial faces, reversing one of the sector-shaped pieces with respect to the other such that the thin edge of one is approximately adjacent the thick edge of the other, slipping the sector-shaped pieces along their opposed radial faces to a position where the two external radial faces are a predetermined distance apart, bonding the two thusly positioned sector-shaped pieces together into a composite member, and machining the composite member into a quadrilateral shape.

2. The process as in claim 1 wherein the composite member is machined into the shape of a parallelogram having the maximum obtainable width.

3. The process as in claim 1 wherein the composite member is machined into a rectangular shape.

4. The process as in claim 2 further including the step of bonding at least two sector pairs in the shape of parallelograms together edgewise to form a wider composite member.

5. The process as in claim 4 further including the step of rip cutting the wider composite member into selected widths.

6. The process as in claim 1 including the step of drying the sector-shaped pieces prior to bonding.

7. The process as in claim 1 including the step of cross cutting the logs into preselected lengths.

8. The process as in claim 1 wherein the sector-shaped pieces to be cut from a selected log are sized according to the formula: $\sin\theta = T/R$;

where $T$ is the height of a sector peice before accounting for losses, $R$ is the log radius before accounting for losses, and $\theta$ the small included angle of the sector piece, with $T$ being a preselected value depending upon the desired thickness of the composite lumber product and $R$ is known so that $\theta$ is the calculated value in sizing the sectors to be cut from the selected log.

9. The process as in claim 1 wherein the even number of sector-shaped pieces are cut from any log with the log being sized according to the formula: $R = T/\sin\theta$; where $T$ is the height of a sector piece before accounting for losses, $\theta$ the small included angle of the sector piece, and $R$ is the log radius before accounting for losses; with $T$ being a preselected value for any log depending upon the desired thickness of the composite lumber product and $\theta$ is known for a given number of even cuts from a log so that $R$ is the calculated optimum value in sizing the log from which the sector pieces are to be cut.

10. The process as in claim 9 wherein a log having a radius falling between two calculated optimum $R$'s is cut an even number of times as if it had the larger radius thereby forming undersized sectors and then slipping the undersized sector pieces toward each other along their opposed radial faces prior to bonding to a position where the two external radial faces are a predetermined distance apart.

11. The process as in claim 9 wherein a log having a radius falling between two calculated optimum $R$'s is cut an even number of times as if it had the smaller radius thereby forming oversized sectors and then slipping the oversized sector pieces away from each other along their opposed radial faces prior to bonding to a position where the two external radial faces are a predetermined distance apart.

12. The process as in claim 1 wherein two sector-shaped pieces are reversed longitudinally with respect to one another prior to bonding in order to capture taper volume.

* * * * *

UNITED STATES PATENT OFFICE
CERTIFICATE OF CORRECTION

PATENT NO. : 3,961,654

DATED : June 8, 1976

INVENTOR(S) : EARL DEAN HASENWINKLE

It is certified that error appears in the above-identified patent and that said Letters Patent are hereby corrected as shown below:

in column 1, line 56, "with" should read --when--;

in column 2, line 24, "a" should read --the--;

in column 2, line 53, "said" should read --same--;

in column 4, line 64, "of", second instance, should read --or--;

in column 5, line 55, "at" should read --as--;

in column 6, line 18, "Head" should read --Heat--;

in column 8, line 54, "aaw" should read --saw--;

in column 9, line 59, "0.058" should read --0.588--;

in column 11, line 9, "segmented" should read --segment--;

in column 11, line 9, "8 inches" should read --8 feet--;

in column 12, line 3, "diameter" should read --diameters--;

in column 13, line 6, "long diameter" should read --log diameters--;

in column 13, line 51, "28" should read --38--;

in column 14, line 3, "for" should read --of--;

UNITED STATES PATENT OFFICE

CERTIFICATE OF CORRECTION

PATENT NO. : 3,961,654

DATED : June 8, 1976

INVENTOR(S) : EARL DEAN HASENWINKLE

It is certified that error appears in the above-identified patent and that said Letters Patent are hereby corrected as shown below:

in column 14, line 6, " 5-1/2 " should read --5-1/2"--;

in column 14, line 7, " 6-1/2 " should read --6-1/2"--;

in column 15, line 39, "peice" should read --piece--; and in column 16, line 7, "the" should read "an".

Signed and Sealed this

First Day of February 1977

[SEAL]

*Attest:*

RUTH C. MASON
*Attesting Officer*

C. MARSHALL DANN
*Commissioner of Patents and Trademarks*